United States Patent
Golara et al.

(10) Patent No.: US 11,296,599 B1
(45) Date of Patent: Apr. 5, 2022

(54) ANALOG SUPPLY GENERATION USING LOW-VOLTAGE DIGITAL SUPPLY

(71) Applicant: Apple Inc., Cupertino, CA (US)

(72) Inventors: Soheil Golara, San Jose, CA (US); Ali Mesgarani, Sunnyvale, CA (US); Seyedeh Sedigheh Hashemi, Santa Clara, CA (US); Mansour Keramat, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/235,718

(22) Filed: Apr. 20, 2021

(51) Int. Cl.
*H02M 3/07* (2006.01)
*G05F 3/26* (2006.01)
*G05F 1/46* (2006.01)

(52) U.S. Cl.
CPC .............. *H02M 3/073* (2013.01); *G05F 1/46* (2013.01); *G05F 1/462* (2013.01); *G05F 1/465* (2013.01); *G05F 3/262* (2013.01); *G05F 3/265* (2013.01)

(58) Field of Classification Search
None
See application file for complete search history.

(56) References Cited

U.S. PATENT DOCUMENTS

| | | | |
|---|---|---|---|
| 4,825,099 A * | 4/1989 | Barton | H03K 17/166 323/315 |
| 5,530,398 A * | 6/1996 | Shamlou | H02M 3/07 327/331 |
| 6,114,845 A * | 9/2000 | Capici | G05F 3/30 323/281 |
| 8,085,019 B2 * | 12/2011 | Cho | G05F 1/56 323/281 |
| 8,581,568 B2 | 11/2013 | Liang et al. | |
| 9,477,244 B2 * | 10/2016 | Luo | G05F 1/56 |
| 10,447,145 B1 | 10/2019 | Perrin et al. | |
| 10,831,228 B2 | 11/2020 | Acar et al. | |
| 2006/0061346 A1 * | 3/2006 | Lee | G05F 1/465 323/313 |
| 2009/0085538 A1 * | 4/2009 | Miguchi | H05B 45/38 323/273 |
| 2016/0103459 A1 * | 4/2016 | Chern | G05F 1/468 323/313 |
| 2020/0326739 A1 * | 10/2020 | Zhao | H02M 3/33561 |
| 2020/0401167 A1 * | 12/2020 | Helmy Zaky | G05F 1/46 |

* cited by examiner

*Primary Examiner* — Thomas J. Hiltunen
(74) *Attorney, Agent, or Firm* — Kowert, Hood, Munyon, Rankin & Goetzel, P.C.

(57) ABSTRACT

A power supply circuit included in a computer system regulates a power supply voltage using an input power supply. During startup, the power supply circuit uses a first reference voltage that is generated using the input power supply to regulated the power supply voltage. After a period of time has elapsed, the power supply circuit switches to using a more accurate second reference voltage that is generated using the regulated power supply voltage.

17 Claims, 14 Drawing Sheets ions, ment of a method for operating a power supply circuit.
ANALOG SUPPLY GENERATION USING LOW-VOLTAGE DIGITAL SUPPLY

BACKGROUND

Technical Field

Embodiments described herein relate to integrated circuits, and more particularly, to techniques for generating power supply voltage levels.

Description of the Related Art

Modern computer systems may include multiple circuit blocks designed to perform various functions. For example, such circuit blocks may include processors and/or processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels on the power supply nodes for the different circuit blocks.

Power management circuits often include one or more power supply circuits configured to generate regulated voltage levels on respective power supply signals using a voltage level of an input power supply signal. Such power supply circuits may employ different techniques for regulating the voltage level of the power nodes. For example, a power supply circuit may include a switching regulator, a linear regulator, or any suitable combination thereof.

SUMMARY OF THE EMBODIMENTS

Various embodiments for generating a voltage level on a regulated power supply node using a lower-voltage power supply are disclosed. Broadly speaking, a power supply circuit includes one or two reference circuits and a power converter circuit. A first one of the reference circuits is configured to generate, using a voltage level of an input power supply, a first reference voltage with a first tolerance. A second one of the reference circuits is configured to generate, using a voltage level of a regulated power supply node, a second reference voltage with a second tolerance that is less than the first tolerance. The power converter circuit is configured to, in response to an activation of a startup signal, generate a particular voltage level on the regulated power supply node using the voltage level of the input power supply node and the first reference voltage. The power converter circuit is further configured, in response to a determination that a particular time period has elapsed since the activation of the startup signal, generate the particular voltage level on the regulated power supply node using the voltage level of the input power supply node and the second reference voltage.

BRIEF DESCRIPTION OF THE DRAWINGS

The following detailed description makes reference to the accompanying drawings, which are now briefly described.

DETAILED DESCRIPTION OF EMBODIMENTS

Computer systems may include multiple circuit blocks configured to perform specific functions. For example, a computer system may include a processor circuit, a memory circuit, and various analog, radio-frequency, and mixed-signal circuits. Such analog, radio-frequency, and mixed-signal circuits blocks may perform a variety of functions, such as analog-to-digital conversion, radio-frequency up convert and down convert, amplification of signals, and the like.

To operate properly, analog, radio-frequency, and mixed-signal circuits may employ high-voltage, low-noise, and high-precision power supply nodes (also referred to as "power supply rails"). In some cases, an off-chip power management integrated circuit (PMIC) may be used to generate the desired high-precision high-voltage levels, while on-chip regulated circuits may be employed to suppress noise on the power supply nodes.

In ultra-dense digital-intensive integrated circuits (e.g., a system-on-a-chip or "SoC"), it can be costly to include on-chip regulator circuits or to include the solder bumps needed to connect internal power rails to external PMICs. The added cost makes it difficult for high-performance analog circuits to coexist with digital circuits on an SoC. In such cases, charge pump circuits may be utilized to create a high-precision analog power supply circuit that utilizes low-voltage noisy digital power supply rails to generate high voltages with low noise on analog supply nodes.

Such power supply circuits can employ a precision reference circuit that generates a reference voltage used to regulate a voltage level on the high-precision power supply nodes. To achieve the desired precision on the voltage level on the high-precision power supply nodes, the precision reference circuit may be coupled to a high-precision power supply node. During startup of such power supply circuits, there is a period of time during which the voltage level on the high-precision power supply node may be insufficient for the precision circuit to operate correctly. This can lead to excursions in the voltage level of the high-precision power supply node that may result in unwanted power consumption as well as possible damage, stress, or incorrect operation of circuits coupled to the high-precision power supply node. Techniques described in the present disclosure allow for the generation, using the low-voltage digital power supply node, of a less precise reference voltage that is used during startup of a power supply circuit that helps maintain the voltage level of a high-precision power supply node until the voltage level of the high-precision power supply node is sufficient that a more precise reference voltage can be generated. By employing the less precise voltage reference during startup, the voltage level of the high-precision power supply node may be kept within desired limits to reduce the risk to load circuits coupled to the high-precision power supply node.

Figure 1:
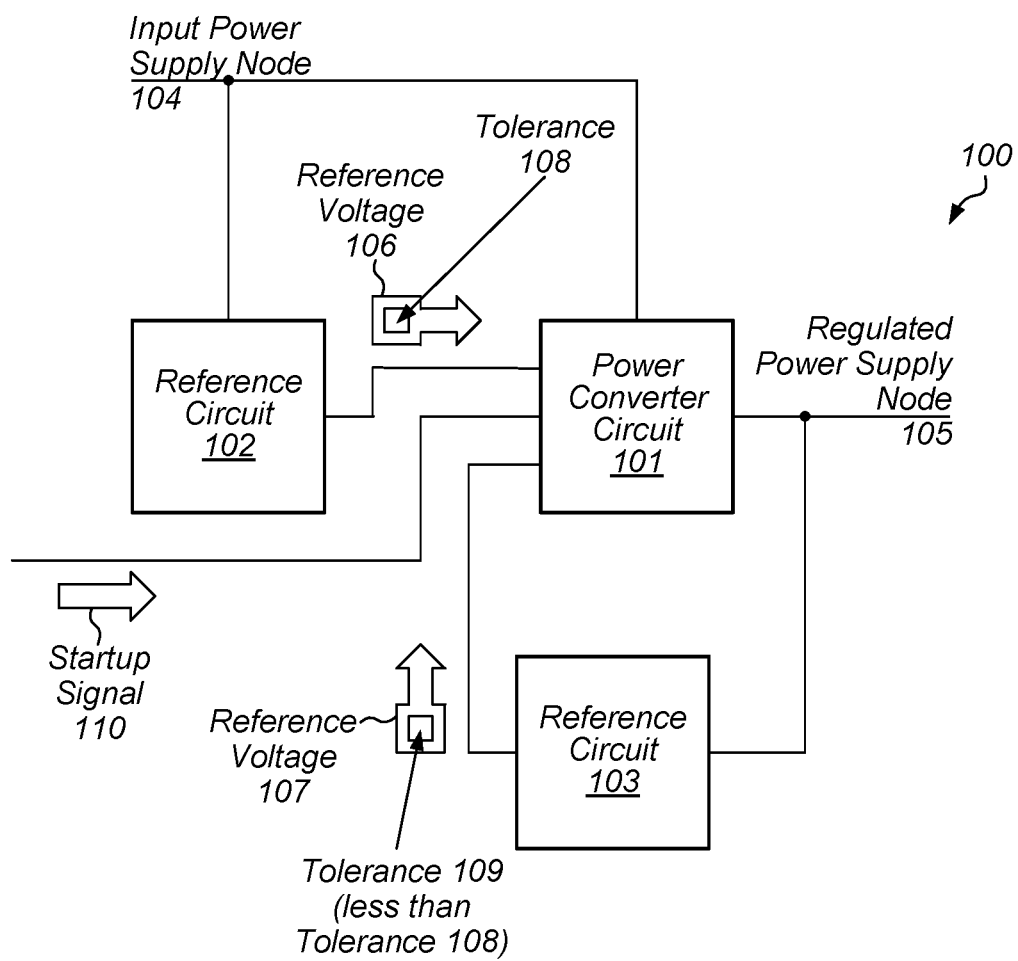
FIG. 1 is a block diagram of an embodiment of a power supply circuit.

A block diagram depicting an embodiment of a power supply circuit is depicted in FIG. 1. As illustrated, power supply circuit 100 includes power converter circuit 101, reference circuit 102, and reference circuit 103.

Reference circuit 102 is configured to generate, using a voltage level of input power supply node 104, reference voltage 106 with tolerance 108. In various embodiments, reference circuit 102 may by implemented as a compact reference circuit that includes a startup circuit to ensure that reference circuit 102 does not become stuck in an incorrect stability point. As used herein, tolerance refers to a variation of a signal from its desired value. For example, a desired value of reference voltage 106 may be 300 mV with a tolerance of 15% (i.e., reference voltage 106 may vary by 45 mV).

Reference circuit 103 is configured to generate, using a voltage level of regulated power supply node 105, reference voltage 107 with a second tolerance value. In various embodiments, tolerance 109 is less than tolerance 108. As described below, reference circuit 103 may include a bandgap reference circuit that generates reference voltage 107 using the voltage level of regulated power supply node 105.

Power converter circuit 101 is configured, in response to an activation of startup signal 110, to generate a particular voltage level on regulated power supply node 105 using the voltage level of input power supply node 104 and reference voltage 106. As described below, power converter circuit 101 may include a charge pump circuit with multiple pump stages that may be implemented as voltage doubler circuits.

Power converter circuit 101 is also configured, in response to a determination that a particular time period has elapsed since the activation of startup signal 110, to generate the particular voltage level on regulated power supply node 105 using the voltage level of input power supply node 104 and reference voltage 107. By using a reference voltage generated using the voltage level of input power supply node 104 during startup, power supply circuit 100 can limit excursions of the voltage level on regulated power supply node 105 to avoid damaging or reducing reliability of circuits coupled to regulated power supply node 105.

Figure 2:
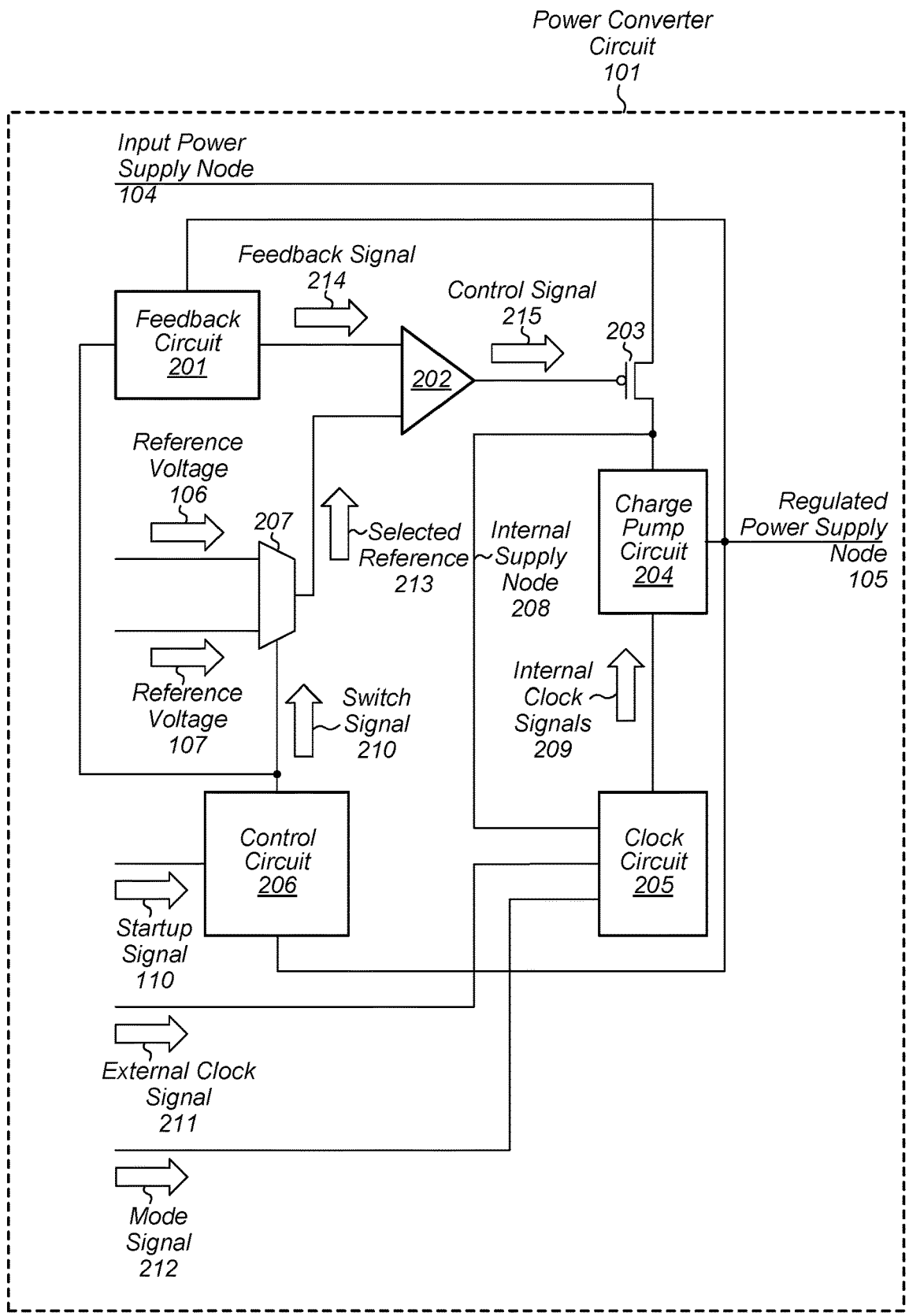
FIG. 2 is a block diagram of an embodiment of a power converter circuit.

Turning to FIG. 2, a block diagram of power converter circuit 101 is depicted. As illustrated, power converter circuit 101 includes feedback circuit 201, comparator circuit 202, device 203, charge pump circuit 204, clock circuit 205, control circuit 206, and multiplex circuit 207.

Feedback circuit 201 is configured to generate feedback signal 214 using a voltage level of regulated power supply node 105 and switch signal 210. As described below, feedback circuit 201 may operate differently depending on a value of switch signal 210. For example, for one value of switch signal 210, feedback circuit 201 may employ one set of circuit elements to generate feedback signal 214, and for a different value of switch signal 210, feedback circuit 201 may employ a second set of circuit elements to generate feedback signal 214. In some embodiments, a voltage level of feedback signal 214 may be a scaled version of the voltage level of regulated power supply node 105.

Multiplex circuit 207 is configured to generate selected reference 213 using reference voltage 106, reference voltage 107, and switch signal 210. In some embodiments, multiplex circuit 207 is configured, using switch signal 210, to select one of reference voltage 106 and reference voltage 107 to generate selected reference 213. For example, for a given value of switch signal 210, multiplex circuit 207 may select reference voltage 106 to generate selected reference 213, while for a different value of switch signal 210 multiplex circuit 207 may select reference voltage 107. In various embodiments, multiplex circuit 207 may be implemented using multiple pass gate circuits coupled together in a wired-OR fashion, where the pass gate circuits are control using signals derived from switch signal 210.

Comparator circuit 202 is configured to generate control signal 215 using feedback signal 214 and selected reference 213. In some embodiments, comparator circuit 202 is configured to generate control signal 215 such that a voltage level of control signal 215 is proportional to a difference between a voltage level of feedback signal 214 and a voltage level of selected reference 213. Comparator circuit 202 may, in various embodiments, be implemented using a differential amplifier circuit, or other suitable circuit configured to generate an output signal by comparing two input signals.

Device 203 is configured to change a conductance between input power supply node 104 and internal supply node 208 using control signal 215. In some embodiments, a conductance of device 203 is a function of a voltage level of control signal 215. In various embodiments, device 203 may be implemented as a p-channel metal-oxide semiconductor field-effect transistor or other suitable transconductance device.

Charge pump circuit 204 is configured to generate a particular voltage level on regulated power supply node 105 using the voltage level of internal supply node 208 and internal clock signals 209. As described below, charge pump circuit 204 may include multiple pump stages, each configured to selectively charge and discharge, based on internal clock signals 209, respective capacitors to generate corresponding output voltage levels. By combining such pump stages in series, the particular voltage level generated on regulated power supply node 105 may be greater than the voltage level of internal supply node 208.

Clock circuit 205 is configured to generate internal clock signals 209 using external clock signal 211, mode signal 212, and a voltage level of internal supply node 208. In some embodiments, internal clock signals 209 may include multiple non-overlapping clock signals. As described below, clock circuit 205 may include an oscillator circuit whose frequency is based on a voltage level of internal supply node 208. By adjusting the frequency of the oscillator circuit based on the voltage level of internal supply node 208, clock circuit 205 can adjust respective frequencies of internal clock signals 209 to compensate for different load conditions on regulated power supply node 105. In some modes of operation, clock circuit 205 is configured, based on a value of mode signal 212, to generate internal clock signals 209 using external clock signal 211 to allow external control of internal clock signals 209 for test or debug purposes.

Control circuit 206 is configured generate switch signal 210 using startup signal 110. As described below, control circuit 206 may employ a timer or counter circuit to change a value of switch signal 210 after a particular period of time has elapsed after an activation of startup signal 110. In some embodiments, control circuit 206 may be configured to change the value of switch signal 210 in response to a voltage level of regulated power supply node 105 reaching a threshold value after the activation of startup signal 110. In various embodiments, startup signal 110 may be activated in response to a system start or reset, or other suitable regulation event for power supply circuit 100.

Figure 3:
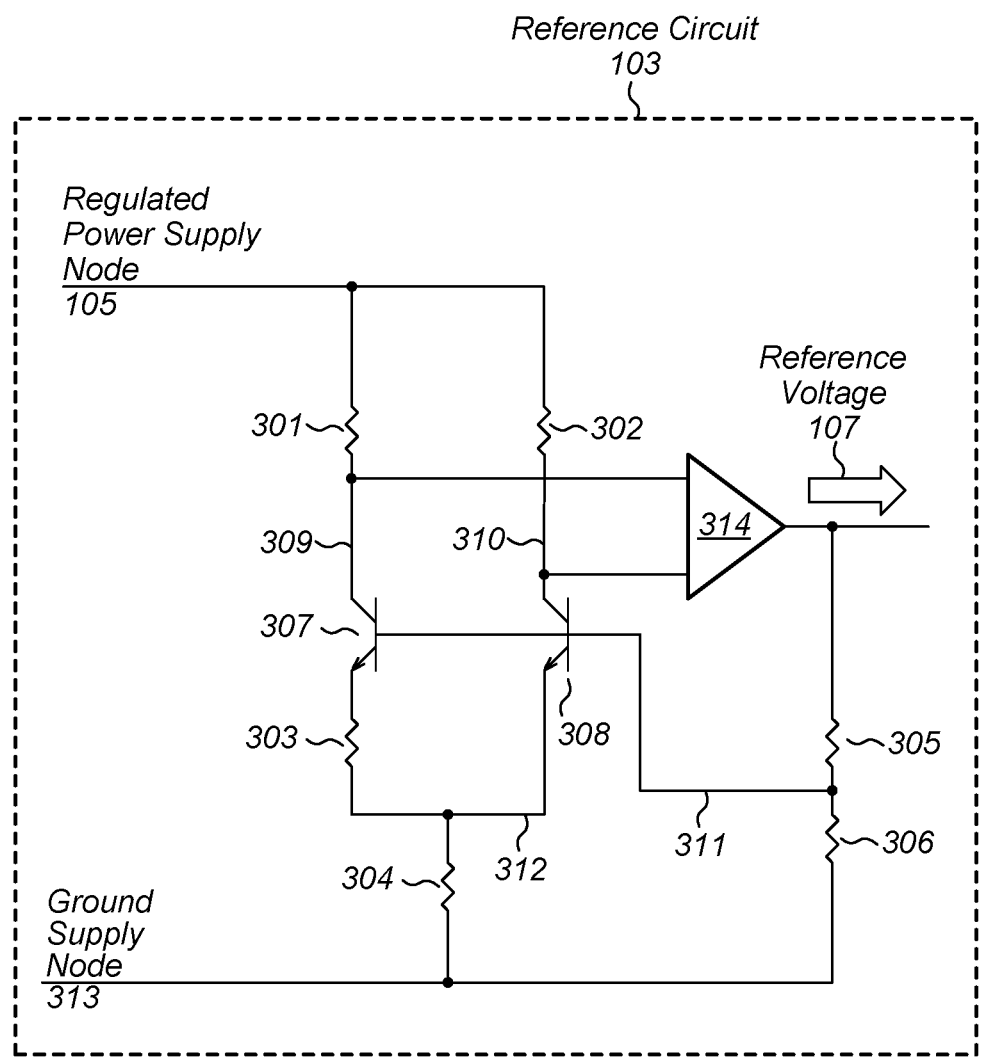
FIG. 3 is a block diagram of an embodiment of a reference circuit.

As described above, reference voltage 107 generated by reference circuit 103 has a smaller tolerance value than reference voltage 106. To generate a more accurate, i.e., smaller tolerance, reference circuit may be implemented using a bandgap reference circuit. A block diagram of reference circuit 103 implemented using a bandgap reference circuit is depicted in FIG. 3. As illustrated, reference circuit 103 includes resistors 301-306, bipolar devices 307 and 308, and error amplifier 314.

Resistor 301 is coupled between regulated power supply node 105 and node 309, while resistor 302 is coupled between regulated power supply node 105 and node 310. Resistor 303 is coupled between bipolar device 307 and node 312, and resistor 304 is coupled between node 312 and ground supply node 313. Resistor 305 is coupled between the output of error amplifier 314 and node 311, while resistor 306 is coupled between node 311 and ground supply node 313. In various embodiments, resistors 301-306 may be implemented as polysilicon resistors, metal resistors, or resistors fabricated from any other suitable material available on a semiconductor manufacturing process.

Bipolar device 307 is coupled between node 309 and resistor 303, while bipolar device 308 is coupled between node 310 and node 312. Base terminals of bipolar devices 307 and 308 are coupled to node 311. An emitter area of bipolar device 307 may be a multiple of an emitter area of bipolar device 308. In various embodiments, bipolar devices 307 and 308 may be implemented as NPN bipolar transistors or any other suitable bipolar devices.

During operation, currents flowing through resistors 301 and 302 are equal. Since the emitter areas of bipolar devices 307 and 308 are different, the current densities of the bipolar devices 307 and 308 are different. Since bipolar device 307 has a larger emitter area, it has a lower base-to-emitter voltage ("$V_{BE}$") than bipolar device 308. The series combination of device 307 and resistor 303 drop the difference in base-to-emitter voltages between bipolar devices 307 and 308. The bandgap reference voltage ("$V_{BG}$") appears on node 311. Resistors 305 and 306 form a resistive voltage divider that can be used to scale reference voltage 107 to a desired value.

Error amplifier 314 is configured to amplify a difference between respective voltage levels of nodes 309 and 310 to generate reference voltage 107. In some embodiments, error amplifier 314 may be implemented as an operational amplifier or other suitable amplifier circuit. In some cases, error amplifier 314 may employ either bipolar devices, MOS devices, or any suitable combination thereof.

It is noted that the reference circuit depicted in FIG. 3 is merely an example implementation of a bandgap reference circuit. In other embodiments, different types of bipolar devices (e.g., PNP bipolar devices) along with other types of devices, such as field-effect transistors, may be employed.

Figure 4:
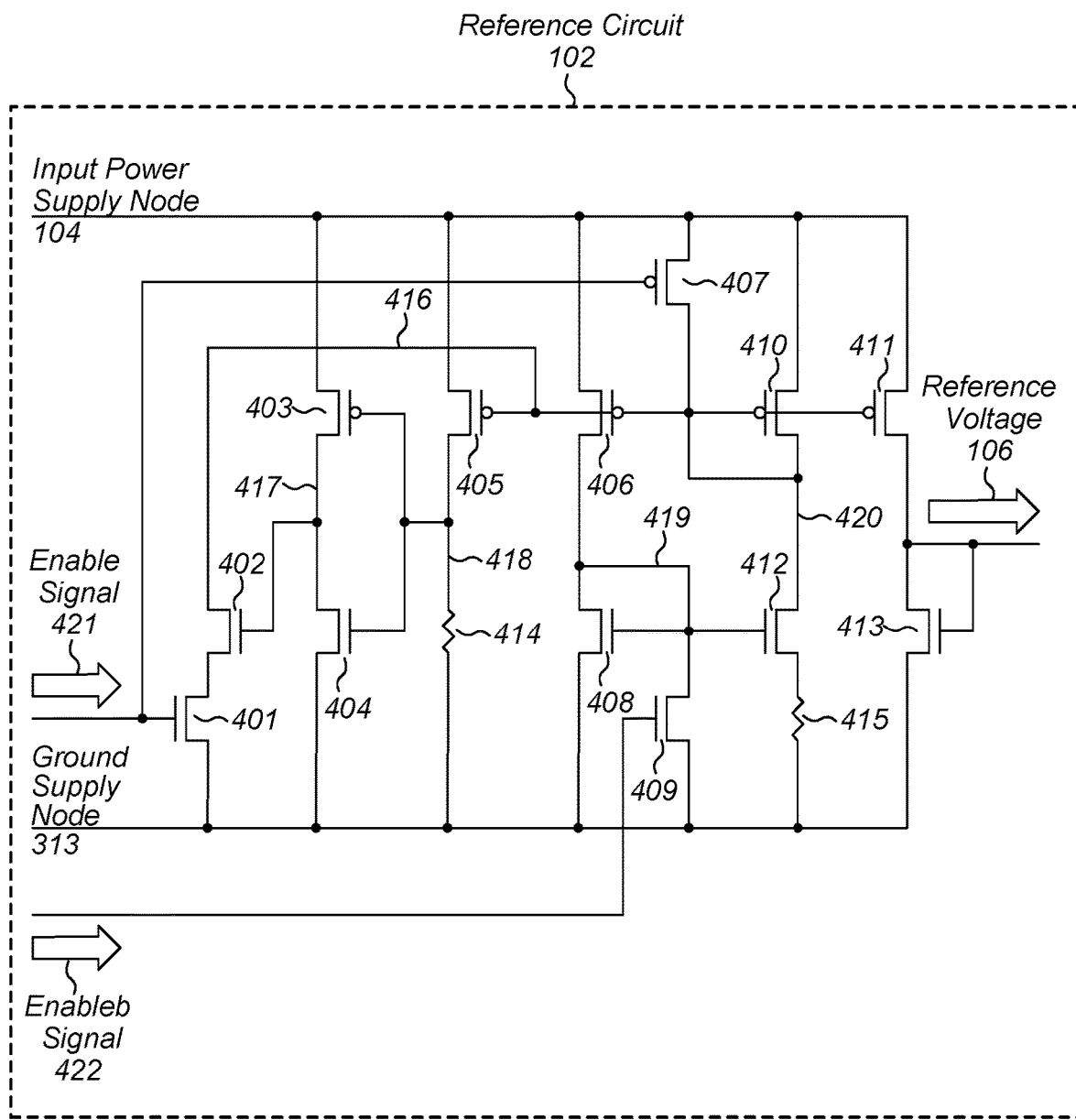
FIG. 4 is a block diagram of another embodiment of a reference circuit.

Turning to FIG. 4, a block diagram of reference circuit 102 is depicted. As illustrated, reference circuit 102 includes devices 401-413, and resistors 414 and 415. In various embodiments, devices 401, 402, 404, 408, 409, 412 and 413 may be implemented as n-channel metal-oxide semiconductor field-effect transistors (MOSFETs), Fin field-effect transistors (FinFETs), or gate-all-around field-effect transistors (GAAFETs), while devices 403, 405, 406, 407, 410, and 411 may be implemented as p-channel MOSFETs, FinFets, or GAAFETs. In some embodiments, resistors 414 and 415 may be implemented using polysilicon, metal, or any other suitable material available on a semiconductor manufacturing process.

Device 401 is coupled between device 402 and ground supply node 313, and is controlled by enable signal 421, while device 402 is coupled between device 401 and node 416, and is controlled by a voltage on node 417. Devices 403 and 404 form an inverter coupled between input power supply node 104 and ground supply node 313, with device 403 coupled between input power supply node 104 and node 417, and device 404 coupled between node 417 and ground supply node 313. Both device 403 and device 404 are controlled by a voltage on node 418.

Device 405 is coupled between input power supply node 104 and node 418, and is controlled by a voltage on node 416. Node 418 is further coupled to resistor 414, which is also coupled ground supply node 313. Device 406 is coupled between input power supply node 104 and node 419, and is controlled by the voltage on node 416. Device 409 is coupled between node 419 and ground supply node 313, and is controlled by enabled signal 422.

Devices 408 and 412 form a current mirror, with device 408 coupled between node 419 and ground supply node 313, and device 412 coupled between node 420 and resistor 415, which is, in turn, coupled to ground supply node 313. Both devices 408 and 412 are controlled by a voltage on node 419.

Devices 410 is coupled between input power supply node 104 and node 420, and is controlled by the voltage on node 420. Device 411 is coupled between input power supply node 104 and device 413, which is coupled in a diode-connected arrangement to ground supply node 313.

It is noted that enable signal 421 is an "active high" and enable signal 422 is an "active low" signal. When inactive, enable signal 421 is at a low logic level and enable signal 422 is at a high logic level. When active, enable signal 421 is at a high logic level and enable signal 422 is a low logic level.

When enable signal 421 and enable signal 422 are inactive, reference circuit 102 is disabled, with device 401 inactive, and devices 407 and 409 active. Current flows through device 407 charging node 420 to the voltage level of input power supply node 104, which disables device 405, allowing node 418 to discharge to ground potential through resistor 414. The low voltage on node 418 activates device 403, charging node 417 to the voltage level of input power supply node 104. Node 419 is discharged to ground via device 409.

To enable reference circuit 102, enable signal 421 and enable signal 422 are activated, which results in device 401 being active, while devices 407 and 409 become inactive. The high voltage level on node 417 activates device 402. With devices 401 and 402 both active, node 416 is discharged to ground, activating devices 405, 406, 410, and 411, forcing reference circuit 102 into a preferred stable state.

With device 406 active, a current flows into device 408, which is mirrored into device 412. The current flowing through device 406 is mirrored into devices 410 and 411. The particular arrangement of current mirrors in reference circuit 102 results in the current flowing in device 411 to be independent of the voltage level of input power supply node 104. The current flowing through device 411 generates a voltage drop across diode-connected device 413 generating reference voltage 106. It is noted that using diode-connected device 413 results in less variation in reference voltage 106 than using a resistor-based output stage.

Figure 5:
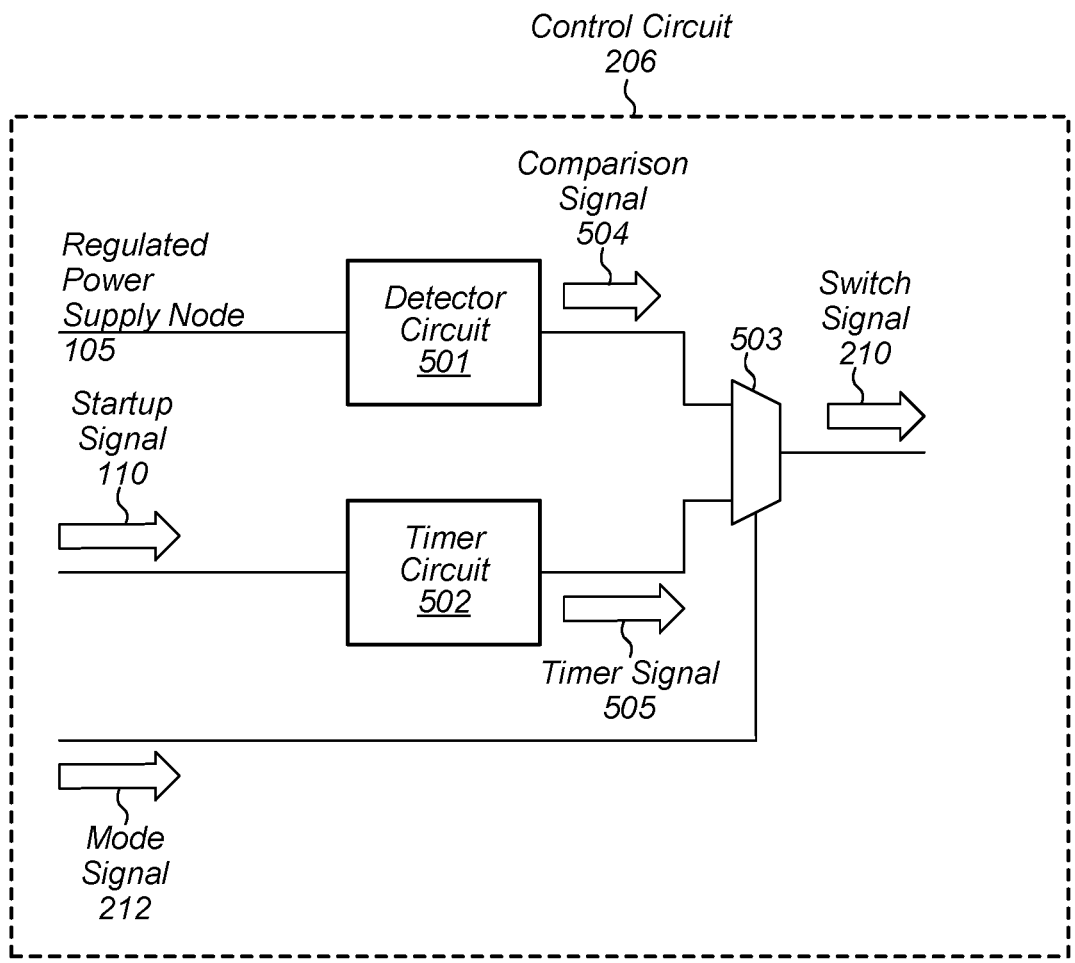
FIG. 5 is a block diagram of an embodiment of a control circuit.

Turning to FIG. 5, a block diagram of control circuit 206 is depicted. As illustrated, control circuit 206 includes detector circuit 501, timer circuit 502, and multiplex circuit 503.

Detector circuit 501 is configured to generate comparison signal 504 using a voltage level of regulated power supply node 105. In various embodiments, detector circuit 501 may be further configured to compare the voltage level of regulated power supply node 105 to a threshold value and, in response to a determination that the voltage level of regulated power supply node 105 is greater than the threshold value, activate comparison signal 504. Detector circuit 501 may be implemented using comparator circuits, reference generator circuits, and various logic circuits.

Timer circuit 502 is configured to generate timer signal 505 using startup signal 110. In various embodiments, timer circuit 502 may be configured to activate timer signal 505 in response to a determination that a particular period of time has elapsed since an activation of startup signal 110. Timer circuit 502 may, in some embodiments, be implemented using a counter circuit or other suitable sequential logic circuit. Alternatively, timer circuit 502 may track the passage of the particular period of time by using a known current to charge a capacitor to a particular voltage level.

Multiplex circuit 503 is configured to select, based on mode signal 212, one of comparison signal 504 and timer signal 505 to generate switch signal 210. In various embodiments, one logic level on mode signal 212 will result in comparison signal 504 being selected to generate switch signal 210, while another logic level on mode signal 212 will result in timer signal 505 being selected to generate switch signal 210. The logic value of mode signal 212 may be selected based on power dissipation during startup of power supply circuit 100, or any other suitable startup operating characteristic of power supply circuit 100.

Figure 6A:
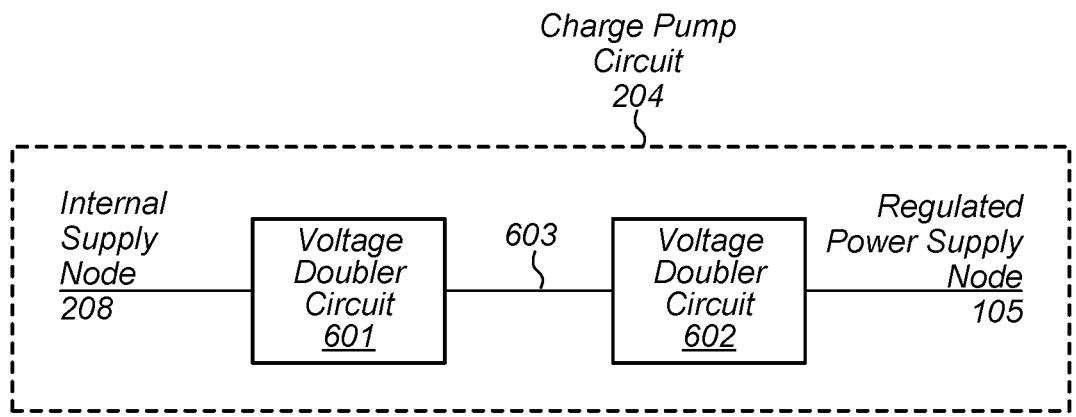
FIG. 6A is a block diagram of an embodiment of a charge pump circuit.

Turning to FIG. 6A, a block diagram of an embodiment of charge pump circuit 204 is depicted. As illustrated, charge pump circuit 204 includes voltage doubler circuit 601 and voltage doubler circuit 602.

Voltage doubler circuit 601 is coupled between internal supply node 208 and node 603. In various embodiments, voltage doubler circuit 601 is configured to generate a voltage level on node 603 using a voltage level of internal supply node 208. Voltage doubler circuit 602 is coupled between node 603 and regulated power supply node 105. In various embodiments, voltage doubler circuit 602 is configured to generate a voltage level on regulated power supply node 105 using the voltage level on node 603.

As described below, voltage doubler circuits 601 and 602 may generate output voltages that are "double" their respective input voltage. In such cases, the voltage level on node 603 is within a threshold value of twice the voltage level on internal supply node 208. In a similar fashion, the voltage level on regulated power supply node 105 is within a threshold value of twice the voltage level on node 603. By adjusting the voltage level of internal supply node 208, as described above, the voltage level of regulated power supply node 105 may be regulated to a desired value.

Although only two stages of voltage doubler circuits are depicted in the embodiment of FIG. 6A, in other embodiments, additional stages of voltage doubler circuits may be employed in a modular fashion.

Figure 6B:
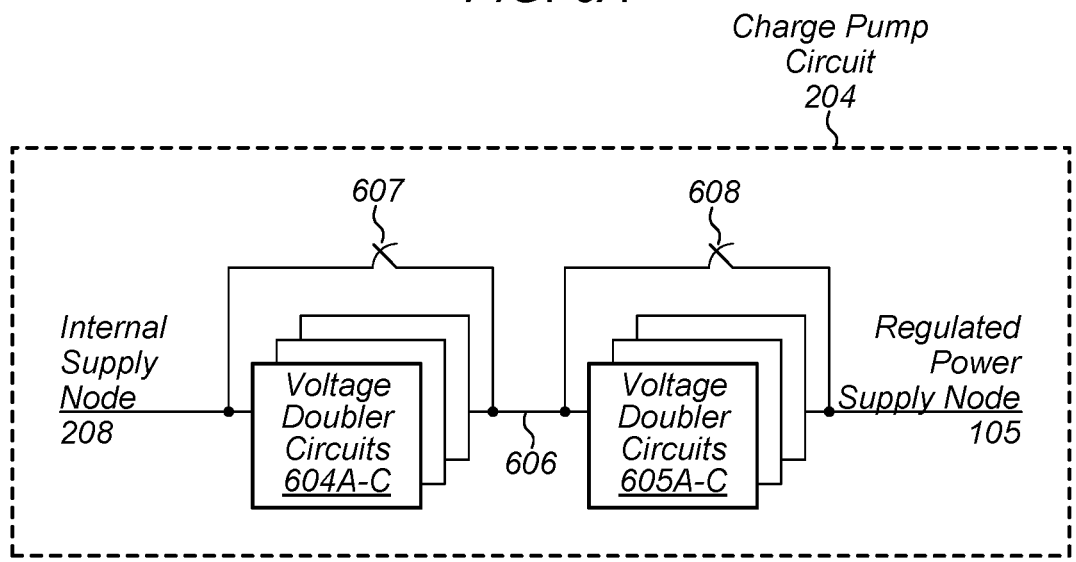
FIG. 6B is a block diagram of another embodiment of a charge pump circuit.

A block diagram illustrating another embodiment of charge pump circuit 204 is depicted in FIG. 6B. As illustrated, charge pump circuit 204 includes voltage doubler circuits 604A-C, voltage doubler circuits 605A-C, switch 607 and switch 608.

Each of voltage doubler circuits 604A-C is coupled, in parallel, between internal supply node 208 and node 606. In a similar fashion, each of voltage doubler circuits 605A-C is coupled, in parallel, between node 606 and regulated power supply node 105. The use of multiple pump stage circuits in parallel increases the ability of charge pump circuit 204 to supply current to load circuits. Although FIG. 6B depicts only three voltage doubler circuits in parallel, in other embodiments, any suitable number of voltage doubler circuits may be employed based on current demands of load circuits.

Switch 607 is coupled between internal supply node 208 and node 606. In a similar fashion, switch 608 is coupled between node 606 and regulated power supply node 105. By closing switch 607, internal supply node 208 is shorted to node 606, effectively removing voltage doubler circuits 604A-C from charge pump circuit 204, which reduces the voltage generated on regulated power supply node 105. A similar result can be obtained by closing switch 608, which would short regulated power supply node 105 to node 606. By closing either of switches 607 and 608, the range of the voltage on regulated power supply node 105 may be adjusted. It is noted that although only two groups of voltage doubler circuits are depicted in the embodiment of FIG. 6B, in other embodiments, any suitable number of voltage doubler circuits, with corresponding switch circuits, may be coupled in series between internal supply node 208 and regulated power supply node 105. Switches 607 and 608 may be implemented as one or more MOSFETs, FinFETs, GAAFETs, or any other suitable transconductance devices.

Figure 7:
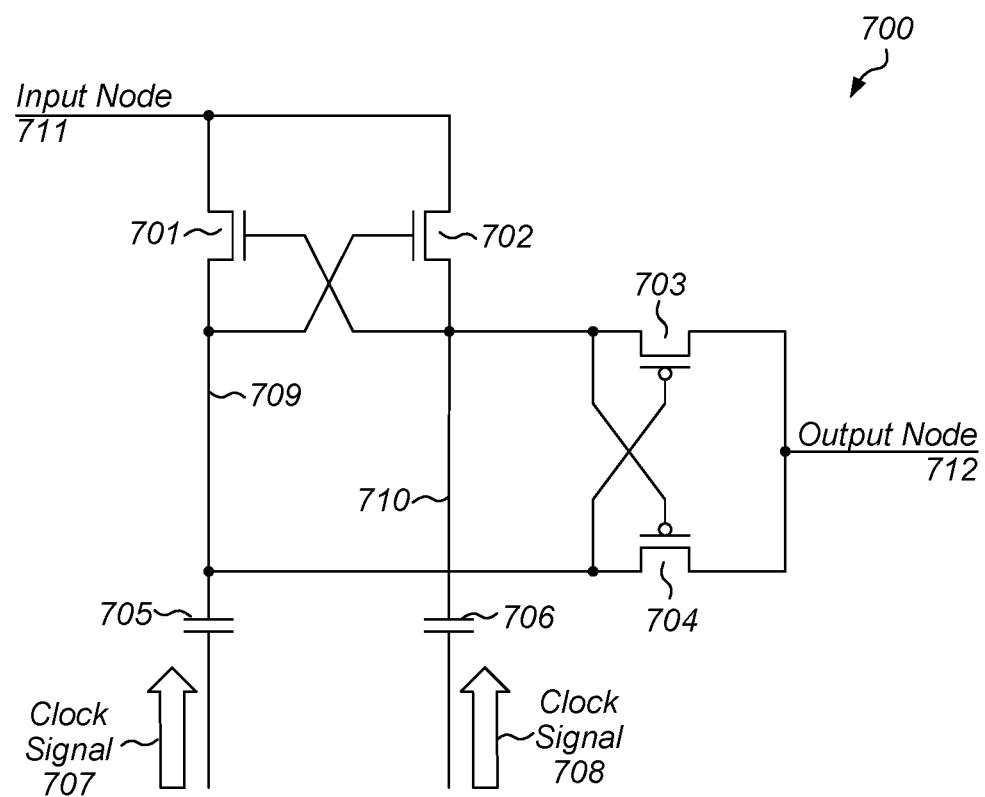
FIG. 7 is a block diagram of an embodiment of a voltage doubler circuit.

Turning to FIG. 7, a block diagram depicting an embodiment of a voltage doubler circuit is depicted. In various embodiments, voltage doubler circuit 700 may correspond to either of voltage doubler circuits 601 or 602, and may be included in voltage doubler circuits 604 and 605. For example, in cases when voltage doubler circuit 700 corresponds to voltage doubler circuit 601, input node 711 corresponds to internal supply node 208, and output node 712 corresponds to node 603. As illustrated, voltage doubler circuit 700 includes devices 701-704, and capacitors 705 and 706.

Device 701 is coupled between input node 711 and node 709, and is controlled by a voltage level of node 710. Device 702 is coupled between input node 711 and node 710, and is controlled by a voltage level of node 709. Additionally, device 703 is coupled between output node 712 and node 710, and is controlled by the voltage level of node 709, while device 704 is coupled between output node 712 and node 709, and is controlled by the voltage level of node 710.

In various embodiments, devices 701 and 702 may be implemented as n-channel MOSFETs or any other suitable transconductance device. Similarly, devices 703 and 704 may be implemented as p-channel MOSFETs, FinFETs, GAAFETs, or any other suitable transconductance devices.

Clock signal 707 is coupled to node 709 via capacitor 705, while clock signal 708 is coupled to node 710 via capacitor 706. In various embodiments, clock signals 707 and 708 may be non-overlapping clock phases that are included in internal clock signals 209. Capacitors 705 and 706 may, in various embodiments, be implemented as metal-oxide-metal (MOM) capacitors, metal-insulator-metal (MIM) capacitors, or any other suitable capacitor structure available on a semiconductor manufacturing process used to fabricate power supply circuit 100.

During a first half cycle, clock signal 707 is at a low logic level and clock signal 708 is at a high logic level. The low logic level of clock signal 707 pre-charges a bottom plate of capacitor 705 to a voltage level at or near ground potential. The high logic level of clock signal 708 activates device 701, pre-charging node 709 to a voltage level of input node 711.

During a second half cycle, clock signal 707 transitions to a high logic level and clock signal 708 transitions to a low logic level. When clock signal 707 transitions to a high logic level, the top plate of capacitor 705 (as well as node 709) jumps to a voltage level that is within a threshold of twice the voltage level of input node 711. The voltage level on node 709 is then transferred to output node 712 via device 704.

When the second half cycle completes, clock signal 707 transitions back to a low logic level, and clock signal 708 transitions to a high logic level. When clock signal 708 transitions to a high logic level, the top plate of capacitor 706 (as well as node 710) also jumps to a voltage level that is within a threshold of twice the voltage level of input node 711. The voltage level of node 710 is then transferred to output node 712 via device 703. By repeatedly, transitioning clock signals 707 and 708, the voltage level of output node 712 is within a threshold level of twice the voltage level of input node 711.

Figure 8:
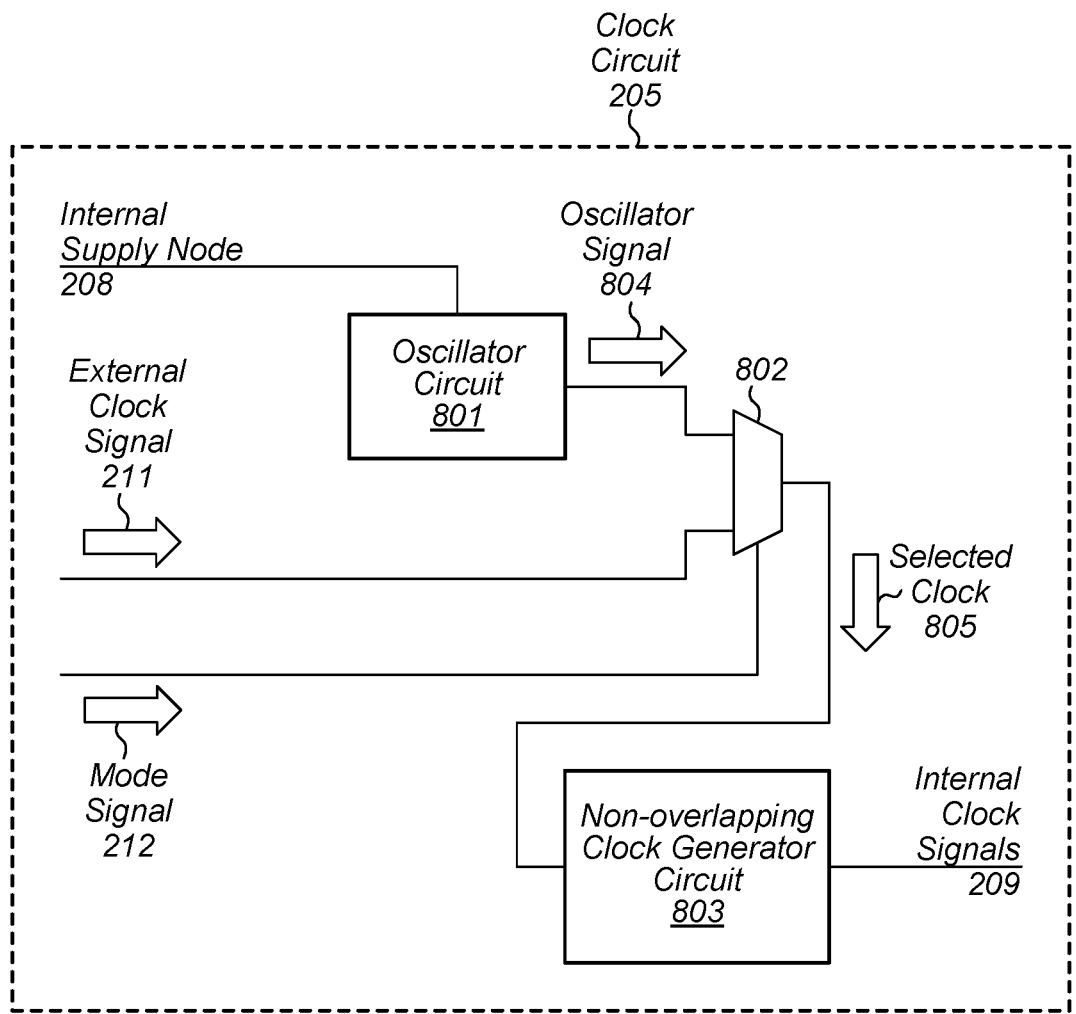
FIG. 8 is a block diagram of an embodiment of a clock circuit.

Turning to FIG. 8, a block diagram of an embodiment of clock circuit 205 is depicted. As illustrated, clock circuit 205 includes oscillator circuit 801, multiplex circuit 802, and non-overlapping clock generator circuit 803.

Oscillator circuit 801 is configured to generate oscillator signal 804 using internal supply node 208. By relying on internal supply node 208 as opposed to input power supply node 104, the frequency of oscillator signal 804 may vary based on the current demand of load circuits coupled to regulated power supply node 105. As load current increases, the voltage drop across the pump stages increased during the finite output impedance of power converter circuit 101. In response to the increase in the voltage drop across the pump stages, power converter circuit 101 compensates by increasing the voltage level of internal supply node 208, which, in turn, increases the frequency of oscillator circuit 801. The increase in the frequency of the oscillator circuit 801 translates to an increase in the frequency of internal clock signals 209, which reduces the effective resistance of the pump stages and, therefore, decreases loss in charge pump circuit 204. In various embodiments, by allowing charge pump circuit 204 to run at a lower frequency during periods of reduced load, the operating power of power converter circuit 101 may be reduced.

In various embodiments, oscillator circuit 801 may be implemented as a ring oscillator circuit, a voltage-controlled oscillator circuit, or any other suitable oscillator circuit whose output signal frequency varies with the voltage level of a power supply coupled to the oscillator circuit.

Multiplex circuit 802 is configured to generate selected clock 805 by selecting either oscillator signal 804 or external clock signal 211 based on mode signal 212. In some cases, mode signal 212 may be used to bypass oscillator circuit 801 during test or debug modes, or other operation modes where a particular frequency that is independent of load conditions is desired. In various embodiments, multiplex circuit 802 may be implemented using multiple pass gate circuits coupled together in a wired-OR fashion. Alternatively, in other embodiments, multiplex circuit 802 may be implemented using any suitable combination of logic gates.

Non-overlapping clock generator circuit 803 is configured to generate internal clock signals 209 using selected clock 805. In various embodiments, internal clock signals 209 include pairs of non-overlapping clock signals that may be employed to control different ones of pump stages included in charge pump circuits 204. The separation between individual clock signals in a pair of non-overlapping clock signals may be selected based on requirements of the pump stages. Non-overlapping clock generator circuit 803 may be implemented using delay circuits along with cross-coupled NAND or NOR gates, or any other suitable combination of logic gates and delay circuits.

As described above, when power supply circuit 100 is initially activated, reference circuit 102 is initially used for regulation. Traditional feedback circuits that rely on resistive voltage dividers can multiply the variation in reference voltage 106. Such multiplication can cause both functionality and reliability issues. For example, if reference voltage 106 is 300 mV and has a variation of +/−50 mV, in order to get the voltage level of regulated power supply node 105 to a desired level of 1.2V, a resistive divider circuit with a ratio of 4 is needed. With such a ratio, the variation of reference voltage 106 can result in a +/−200 mV variation in the voltage level of regulated power supply node 105.

In cases when the voltage level of regulated power supply node 105 is at the high end of the variation induced by the resistive voltage divider circuit, bandgap and other circuits that use the voltage level of regulated power supply node 105 can be stressed, possibly resulting in reliability issues. In cases when the voltage level of regulated power supply node 105 is at the low end of the variation induced by the resistive voltage divider circuit, reference circuit 103, which may include a bandgap reference circuit in some embodiments, may be unable to properly power-up, preventing power supply circuit 100 from switching over to the more accurate reference circuit.

Figure 9:
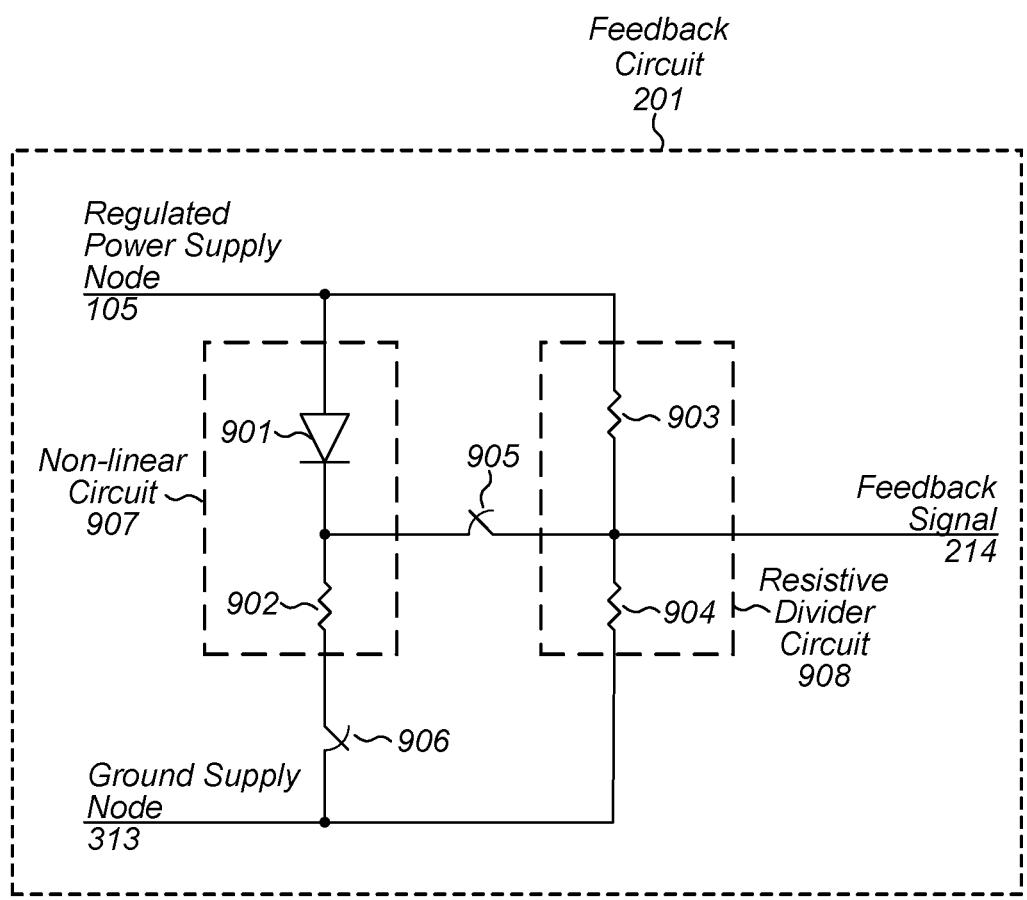
FIG. 9 is a block diagram of an embodiment of a feedback circuit.

To remediate the problems associated with using a resistive voltage divider circuit, a combination feedback circuit may be employed. A block diagram of an embodiment of feedback circuit 201 is depicted in FIG. 9. As illustrated, feedback circuit 201 includes non-linear circuit 907, resistive divider circuit 908, switch 905, and switch 906.

Non-linear circuit 907 is coupled to regulated power supply node 105, switch 905, and switch 906. Switch 905 is coupled to a circuit node for feedback signal 214, and switch 906 is coupled to ground supply node 313. Switches 905 and 906 may be implemented as pass gates, single MOSFETs, or any other suitable switching device or element.

Non-linear circuit 907 includes diode 901 and resistor 902. Diode 901 is coupled between regulated power supply node 105 and resistor 902, which is, in turn, coupled to switch 906. Resistor 902 may be implemented as a metal resistor, a polysilicon resistor, or any other suitable type of resistor. In various embodiments, diode 901 may be implemented using a diode-connected MOSFET, an explicitly fabricated p-n junction, or any other suitable diode structure.

During a startup of power supply circuit 100, switches 905 and 906 are closed, resulting in a current flowing from regulated power supply node 105 through diode 901 and resistor 902, into ground supply node 313. The current results in a voltage on feedback signal 214 that is offset from the voltage of regulated power supply node 105 by the voltage drop across diode 901. By using such an offset, variation in reference voltage 106 translates directly into variation in the voltage level of regulated power supply node 105 without the multiplicative effect induced by a resistive divider circuit. By removing the multiplicative effect on the variation of reference voltage 106, the voltage level of regulated power supply node 105 remains at safe operating levels during startup of power supply circuit 100.

Resistive divider circuit 908 includes resistors 903 and 904, which may be implemented as metal resistors, polysilicon resistors, or any other suitable type of resistor. Resistor 903 is coupled between regulated power supply node 106 and resistor 904, which is, in turn, coupled to ground supply node 313. Once power supply circuit 100 switches from using reference circuit 102 to using reference circuit 103, switches 905 and 906 open, and a current flows from regulated power supply node 105 to ground supply node 313 through resistors 903 and 904. The current that flows through resistors 903 and 904 determines a voltage level of feedback signal 214. By adjusting the values of resistors 903 and 904, the voltage level of regulated power supply node 105 may be scaled to generate feedback signal 214.

Figure 10:
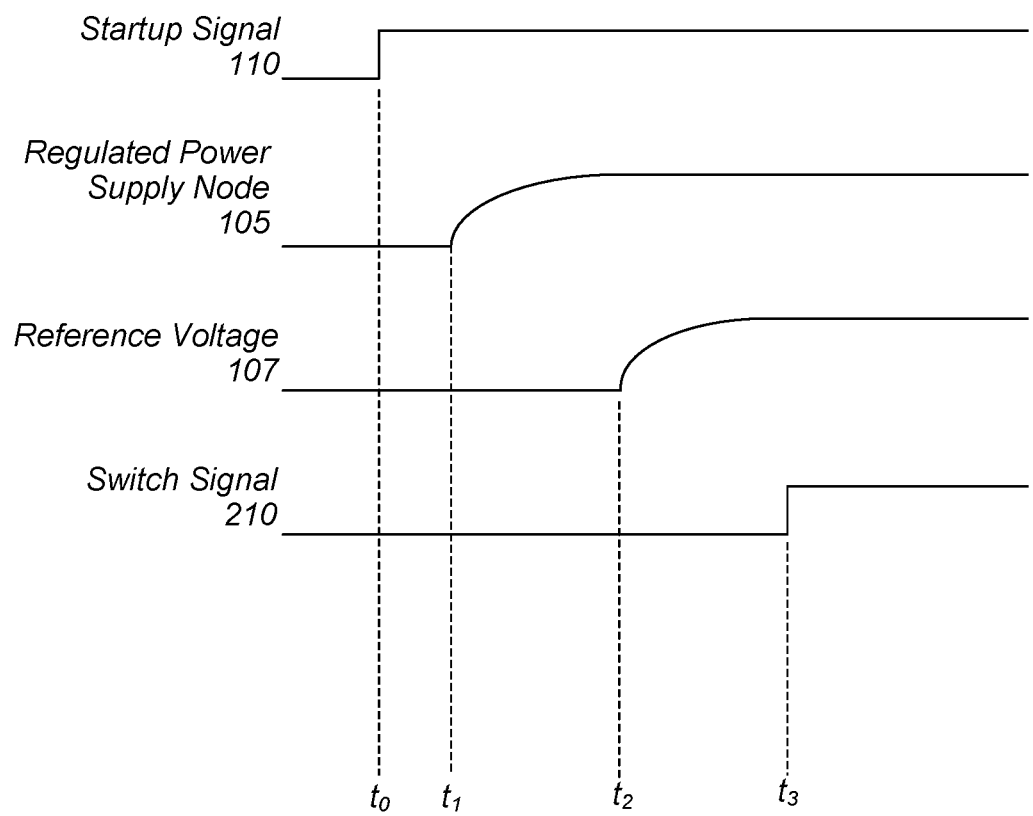
FIG. 10 is a diagram depicting example waveforms associated with the operation of a power supply circuit.

Turning to FIG. 10, a diagram illustrating example waveforms associated with the operation of power supply circuit 100 are depicted. It is noted that the waveforms depicted in FIG. 10 are merely examples, and that in other embodiments, the waveforms may have different shapes and different relative timings.

At time t0, startup signal 110 is activated, resulting in a transition from a low logic level to a high logic level. It is noted that in other embodiments, startup signal 110 may be an "active low" signal that, when activated, is at a low logic level rather than a high logic level.

Once startup signal 110 is activated, reference circuit 102 activates and begins to generate reference voltage 106, which is used by power converter circuit 101 to generate a desired voltage level on regulated power supply node 105. The voltage level on regulated power supply node 105 begins to increase to the desired voltage level at time $t_1$.

As the voltage level on regulated power supply node 105 continues to increase to a particular voltage level, reference circuit 103 begins to generate reference voltage 107 at time $t_2$. At time $t_3$, reference voltage 107 is within some threshold value of its desired voltage, and switch signal 210 is activated, causing power converter circuit 101 to begin using reference voltage 107 for regulation. As described above, activation of switch signal 210 may be controlled by timer circuit 502 or detector circuit 501. It is noted that in some embodiments, once switch signal 210 is activated, reference circuit 102 may be deactivated in order to save power.

Figure 11:
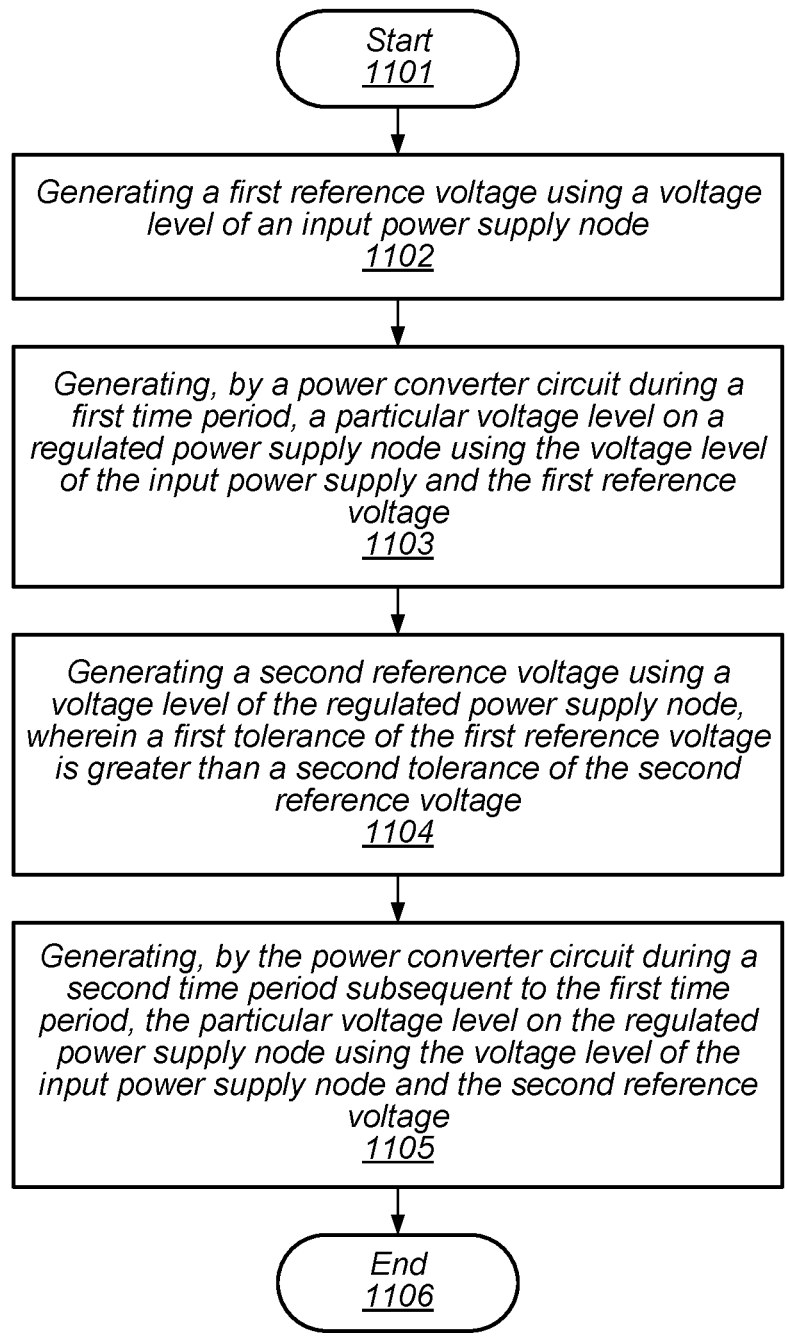
FIG. 11 depicts a flow diagram illustrating an embodiment of a method for operating a power supply circuit.

Turning to FIG. 11, a flow diagram depicting an embodiment of a method for operating a power supply circuit is illustrated. The method, which begins in block 1101, may be applied to various power supply circuits, such as power supply circuit 100 as illustrated in FIG. 1.

The method includes generating a first reference voltage using a voltage level of an input power supply node (block 1102). In various embodiments, generating the first reference voltage may include receiving a startup signal, and activating a reference circuit in response to receiving the startup signal. In some embodiments, the reference circuit may be a compact MOSFET-based reference circuit. By employing such a reference circuit, the power supply circuit may, in various embodiments, be able to reduce a time needed to achieve a desired voltage on a regulated power supply node.

The method further includes generating, by a power converter circuit during a first time period, a particular voltage level on a regulated power supply node using the voltage level of the input power supply node and the first reference voltage (block 1103). In various embodiments, the power converter circuit may include a plurality of charge pump circuits. In such cases, generating the particular voltage level on the regulated power supply node may include generating a first voltage level on a first internal supply node using the voltage level of the input power supply node and a control signal.

The method may also include generating, by a first charge pump circuit of the plurality of charge pump circuits, a second voltage on a second internal power supply node using a clock signal and the voltage level of the first internal supply node, and generating, by a second charge pump circuit of the plurality of charge pump circuits, the particular voltage level on the regulated power supply node using a voltage level of the second internal power supply node and the clock signal. In some embodiments, the method may also include generating the clock signal using the voltage level of the first internal power supply node.

The method also includes generating a second reference voltage using a voltage level of the regulated power supply node, where a first tolerance of the first reference voltage is greater than a second tolerance of the second reference voltage (block 1104). In various embodiments, the method may further include generating, during the first time period, the control signal using the first reference voltage, and generating, during the second time period the control signal using the second reference voltage. Generating the second reference voltage may, in some embodiments, includes generating the second reference voltage using a bandgap reference circuit.

In some embodiments, generating the first voltage level on the first internal supply node may include comparing, during the second time period, the second reference voltage to a feedback signal to generate the control signal. The method may also include adjusting a conductance between the input power supply node and the first internal power supply node.

In various embodiments, the method may also include coupling, during the first time period, the regulated power supply node to a diode to generate the feedback signal. The method may further include coupling, during the second time period, the regulated power supply node to a resistive voltage divider circuit to generate the feedback signal.

The method further includes generating, by the power converter circuit during a second time period subsequent to the first time period, the particular voltage level on the regulated power supply node using the voltage level of the input power supply node and the second reference voltage (block 1105). The method concludes in block 1106.

Figure 12:
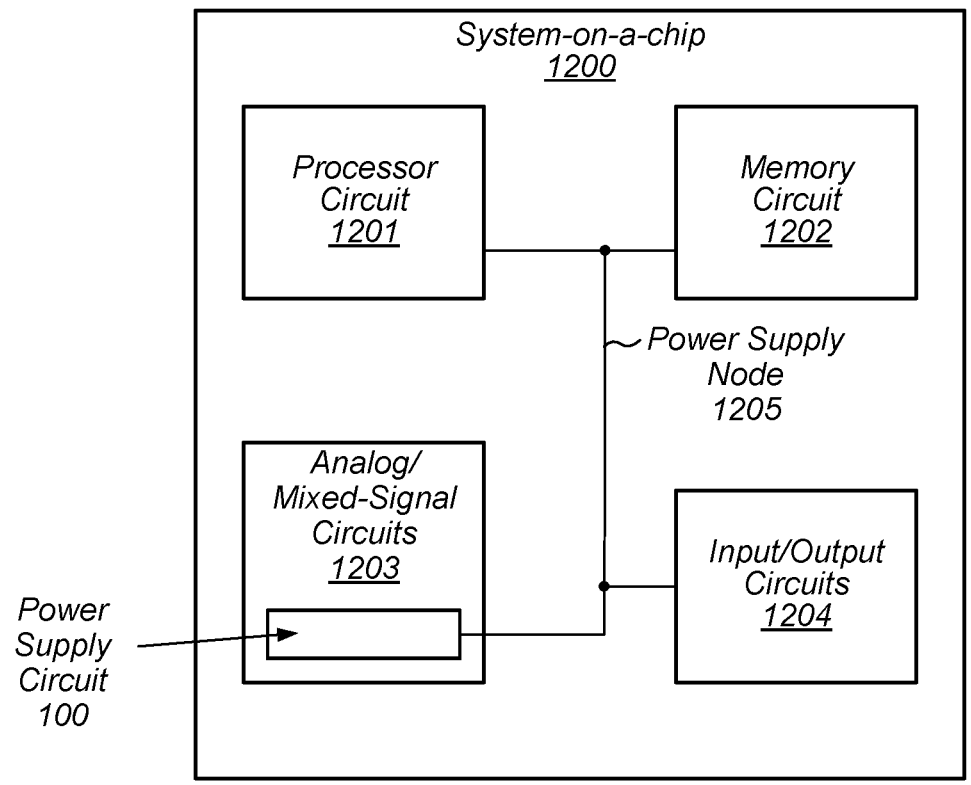
FIG. 12 is a block diagram of a system-on-a-chip.

A block diagram of a system-on-a-chip (SoC) is illustrated in FIG. 12. In the illustrated embodiment, the SoC 1200 includes processor circuit 1201, memory circuit 1202, analog/mixed-signal circuits 1203, and input/output circuits 1204, each of which is coupled to power supply node 1205. In some cases, power supply node 1205 may be a digital power supply node with a noise level not suitable for some analog circuits.

Processor circuit 1201 may, in various embodiments, be representative of a general-purpose processor that performs computational operations. For example, processor circuit 1201 may be a central processing unit (CPU) such as a microprocessor, a microcontroller, an application-specific integrated circuit (ASIC), or a field-programmable gate array (FPGA).

Memory circuit 1202 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 12, in other embodiments, any suitable number of memory circuits may be employed.

Analog/mixed-signal circuits 1203 may include a crystal oscillator circuit, a phase-locked loop circuit, an analog-to-digital converter (ADC) circuit, and a digital-to-analog converter (DAC) circuit (all not shown). In various embodiments, analog/mixed-signal circuits 1203 may include one or more instances of power supply circuit 100 configured to generate, using a voltage level of power supply node 1205, a voltage level on a power supply node that is suitable for use with some analog circuits (e.g., analog-to-digital converter circuit, digital-to-analog converter circuit, etc.).

Input/output circuits 1204 may be configured to coordinate data transfer between SoC 1200 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1204 may be configured to implement a version of Universal Serial Bus (USB) protocol or IEEE 1394 (Firewire®) protocol.

Input/output circuits 1204 may also be configured to coordinate data transfer between SoC 1200 and one or more devices (e.g., other computing systems or integrated circuits) coupled to SoC 1200 via a network. In one embodiment, input/output circuits 1204 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1204 may be configured to implement multiple discrete network interface ports.

Figure 13:
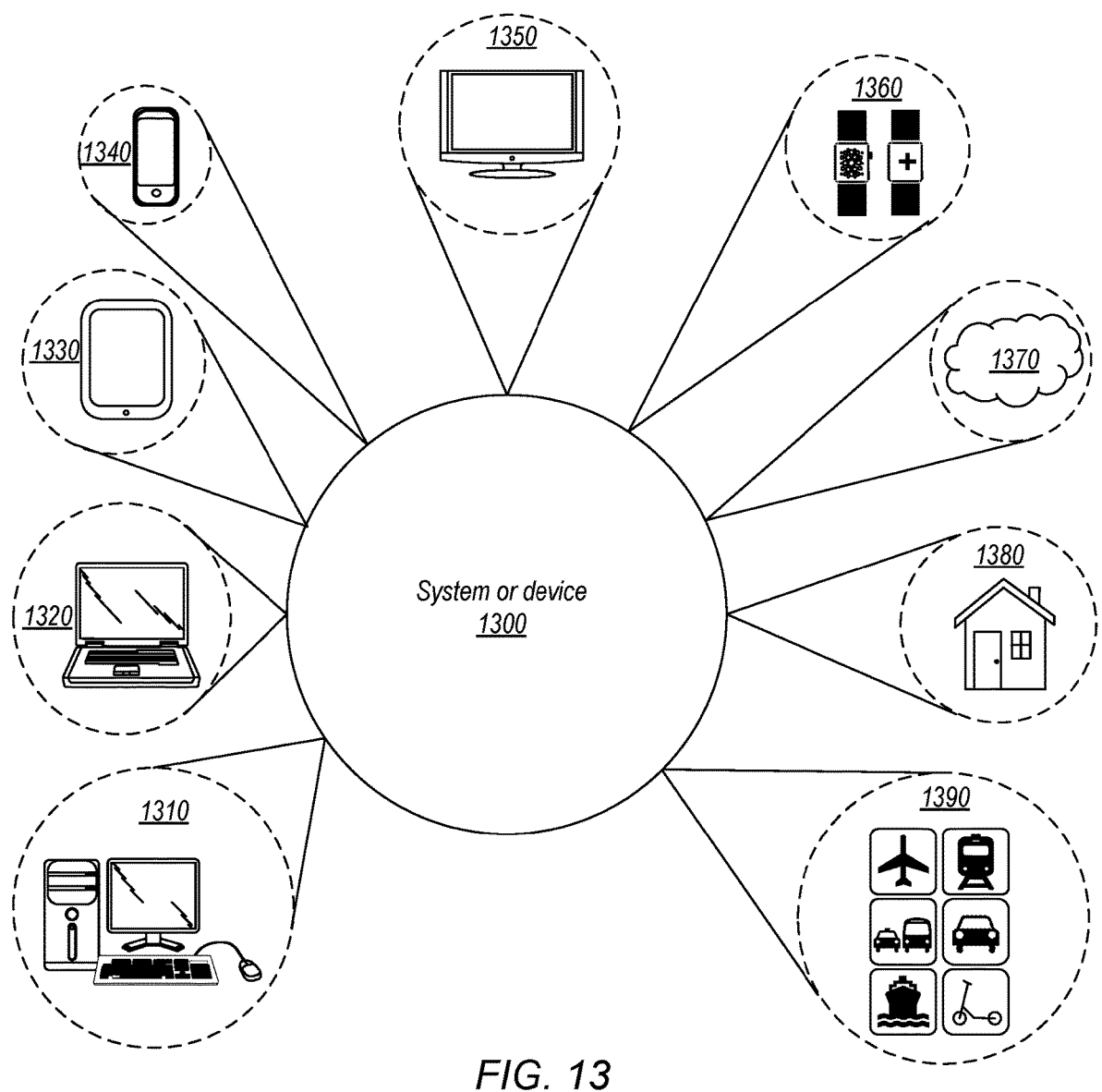
FIG. 13 is a block diagram of various embodiments of computer systems that may include power supply circuits.

Turning now to FIG. 13, various types of systems that may include any of the circuits, devices, or systems discussed above are illustrated. System or device 1300, which may incorporate or otherwise utilize one or more of the techniques described herein, may be utilized in a wide range of areas. For example, system or device 1300 may be utilized as part of the hardware of systems such as a desktop computer 1310, laptop computer 1320, tablet computer 1330, cellular or mobile phone 1340, or television 1350 (or set-top box coupled to a television).

Similarly, disclosed elements may be utilized in a wearable device 1360, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1300 may also be used in various other contexts. For example, system or device 1300 may be utilized in the context of a server computer system, such as a dedicated server or on shared hardware that implements a cloud-based service 1370. Still further, system or device 1300 may be implemented in a wide range of specialized everyday devices, including devices 1380 commonly found in the home such as refrigerators, thermostats, security cameras, etc. The interconnection of such devices is often referred to as the "Internet of Things" (IoT). Elements may also be implemented in various modes of transportation. For example, system or device 1300 could be employed in the control systems, guidance systems, entertainment systems, etc. of various types of vehicles 1390.

The applications illustrated in FIG. 13 are merely exemplary and are not intended to limit the potential future applications of disclosed systems or devices. Other example applications include, without limitation: portable gaming devices, music players, data storage devices, unmanned aerial vehicles, etc.

Figure 14:
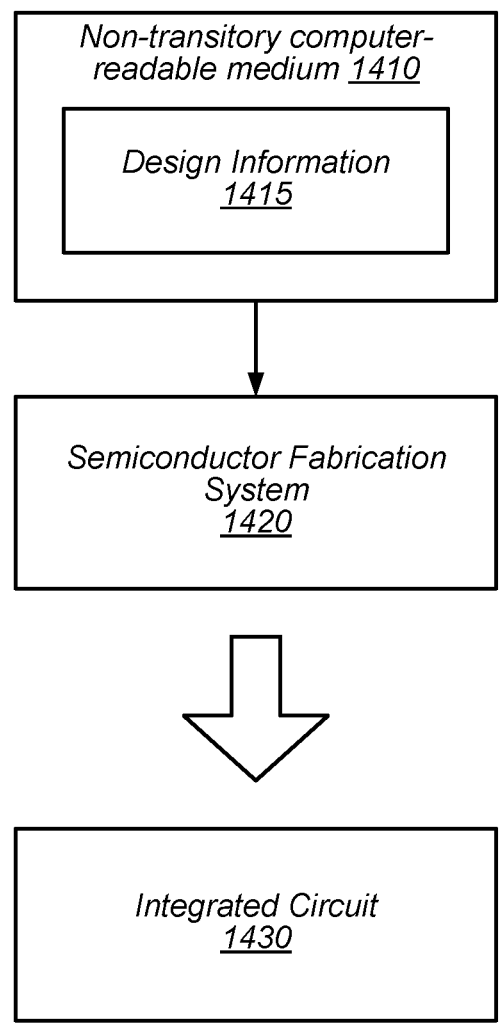
FIG. 14 illustrates an example of a non-transitory computer-readable storage medium that stores circuit design information.

FIG. 14 is a block diagram illustrating an example non-transitory computer-readable storage medium that stores circuit design information, according to some embodiments. In the illustrated embodiment, semiconductor fabrication system 1420 is configured to process the design information 1415 stored on non-transitory computer-readable storage medium 1410 and fabricate integrated circuit 1430 based on the design information 1415.

Non-transitory computer-readable storage medium 1410, may comprise any of various appropriate types of memory devices or storage devices. Non-transitory computer-readable storage medium 1410 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash memory, magnetic media, e.g., a hard drive, or optical storage; registers, or other similar types of memory elements, etc. Non-transitory computer-readable storage medium 1410 may include other types of non-transitory memory as well or combinations thereof. Non-transitory computer-readable storage medium 1410 may include two or more memory mediums, which may reside in different locations, e.g., in different computer systems that are connected over a network.

Design information 1415 may be specified using any of various appropriate computer languages, including hardware description languages such as, without limitation: VHDL, Verilog, SystemC, SystemVerilog, RHDL, M, MyHDL, etc. Design information 1415 may be usable by semiconductor fabrication system 1420 to fabricate at least a portion of integrated circuit 1430. The format of design information 1415 may be recognized by at least one semiconductor fabrication system, such as semiconductor fabrication system 1420, for example. In some embodiments, design information 1415 may include a netlist that specifies elements of a cell library, as well as their connectivity. One or more cell libraries used during logic synthesis of circuits included in integrated circuit 1430 may also be included in design information 1415. Such cell libraries may include information indicative of device or transistor level netlists, mask design data, characterization data, and the like, of cells included in the cell library.

Integrated circuit 1430 may, in various embodiments, include one or more custom macrocells, such as memories, analog or mixed-signal circuits, and the like. In such cases, design information 1415 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1420 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1420 may also be configured to perform various testing of fabricated circuits for correct operation.

In various embodiments, integrated circuit 1430 is configured to operate according to a circuit design specified by design information 1415, which may include performing any of the functionality described herein. For example, integrated circuit 1430 may include any of various elements shown or described herein. Further, integrated circuit 1430 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
   a first reference circuit configured to generate, using a voltage level of an input power supply node, a first reference voltage with a first tolerance value;
   a second reference circuit configured to generate, using a voltage level of a regulated power supply node, a second reference voltage with a second tolerance value less than the first tolerance value; and
   a device configured, in response to an activation of a startup signal, to generate a first voltage on a first internal power supply node using the voltage level of the input power supply node and the first reference voltage;
   a first charge pump circuit configured to generate a second voltage on a second internal power supply node using a clock signal and a voltage level of the first internal power supply node; and
   a second charge pump circuit configured to generate a particular voltage level on the regulated power supply node using the voltage level of the second internal power supply node, and the clock signal; and
   wherein the device is further configured, in response to a determination that a particular time period has elapsed since the activation of the startup signal, to generate the first voltage on the first internal power supply node using the voltage level of the input power supply node and the second reference voltage.

2. The apparatus of claim 1, further comprising:
   a third charge pump circuit coupled in parallel with the first charge pump circuit; and
   a fourth charge pump circuit coupled in parallel with the second charge pump circuit.

3. The apparatus of claim 1, further comprising a feedback circuit configured to:
   generate, in response to the activation of the startup signal, a feedback signal such that a voltage level of the feedback signal is offset from a voltage level of the regulated power supply node by a diode voltage drop; and
   divide, in response to the determination that the particular time period has elapsed, the feedback signal such that the voltage level of the feedback signal is a fraction of the voltage level of the regulated power supply node.

4. The apparatus of claim 3, further comprising a comparator circuit configured to:
   compare, in response to the activation of the startup signal, the first reference voltage to the feedback signal to generate a control signal; and
   compare, in response to determining the particular time period has elapsed, the second reference voltage to the feedback signal to generate the control signal; and
   wherein the device is further configured to generate the first voltage on the first internal power supply node using the control signal.

5. The apparatus of claim 1, wherein the second reference circuit includes a bandgap reference circuit.

6. A method, comprising:
   generating a first reference voltage using a voltage level of an input power supply node;
   generating, by a power converter circuit that includes a plurality of charge pump circuits, a first voltage level on a first internal power supply node using the voltage level of the input power supply node and a control signal;
   generating, by a first charge pump circuit of the plurality of charge pump circuits, a second voltage on a second internal power supply node using a clock signal and the voltage level of the first internal power supply node;
   generating, by a second charge pump circuit of the plurality of charge pump circuits during a first time period, a particular voltage level on a regulated power supply node using the voltage level of the second internal power supply node, and the clock signal;
   generating a second reference voltage using a voltage level of the regulated power supply node, wherein a first tolerance of the first reference voltage is greater than a second tolerance of the second reference voltage; and
   generating, by the power converter circuit during a second time period subsequent to the first time period, the particular voltage level on the regulated power supply node using the voltage level of the input power supply node and the second reference voltage.

7. The method of claim 6, further comprising:
   generating, during the first time period, the control signal using the first reference voltage; and
   generating, during the second time period, the control signal using the second reference voltage.

8. The method of claim 6, wherein generating the first voltage level on the first internal power supply node includes:
   comparing, during the second time period, the second reference voltage to a feedback signal to generate the control signal; and
   adjusting a conductance between the input power supply node and the first internal power supply node.

9. The method of claim 8, further comprising:
coupling, during the first time period, the regulated power supply node to a diode to generate the feedback signal; and
coupling, during the second time period, the regulated power supply node to a resistive voltage divider circuit to generate the feedback signal.

10. The method of claim 8, further comprising generating the clock signal using the voltage level of the first internal power supply node.

11. The method of claim 6 further comprising, generating the second reference voltage using a bandgap reference circuit.

12. An apparatus, comprising:
a functional circuit coupled to a regulated power supply node; and
a power converter circuit that includes a plurality of charge pump circuits, a first internal power supply node, and a second internal power supply node, and wherein the power converter circuit is configured to:
generate a first reference voltage using a voltage level of an input power supply node;
in response to receiving an activation signal:
generate a first voltage level on the first internal power supply node using the voltage level of the input power supply node and a control signal;
generate, using a first charge pump circuit of the plurality of charge pump circuits, a second voltage on the second internal power supply node using a clock signal and the voltage level of the first internal power supply node;
generate, using a second charge pump circuit of the plurality of charge pump circuits, a particular voltage level on the regulated power supply node using a voltage level of the second internal power supply node, and the clock signal;
generate a second reference voltage using a voltage level of the regulated power supply node, wherein a first tolerance of the first reference voltage is greater than a second tolerance of the second reference voltage; and in response to a determination that a particular time period has elapsed, generate the particular voltage level on the regulated power supply node using the voltage level of the input power supply node and the second reference voltage.

13. The apparatus of claim 12, wherein the power converter circuit is further configured to:
generate, in response to receiving the activation signal, the control signal using the first reference voltage; and
generate, in response to the determination the particular time period has elapsed, the control signal using the second reference voltage.

14. The apparatus of claim 12, wherein to generate the first voltage level on the first internal power supply node, the power converter circuit is further configured to:
compare, after the particular time period has elapsed, the second reference voltage to a feedback signal to generate the control signal; and
adjust a conductance between the input power supply node and the first internal power supply node.

15. The apparatus of claim 14, wherein the power converter circuit includes:
a non-linear circuit configured, in response to receiving the activation signal, to subtract an offset from the voltage level of the regulated power supply node to generate the feedback signal; and
a resistive voltage divider circuit configured, in response to the determination that the particular time period has elapsed, to divide the voltage level of the regulated power supply node to generate the feedback signal.

16. The apparatus of claim 14, wherein the power converter circuit is further configured to generate the clock signal using the voltage level of the first internal power supply node.

17. The apparatus of claim 12, wherein the power converter circuit includes a bandgap reference circuit configured to generate the second reference voltage.

* * * * *